C. W. TAYLOR.
DIFFERENTIAL MECHANISM.
APPLICATION FILED MAY 5, 1916.
1,220,289.
Patented Mar. 27, 1917.
2 SHEETS—SHEET 2.
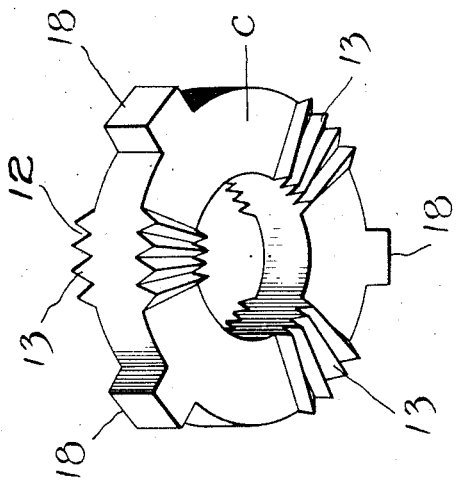
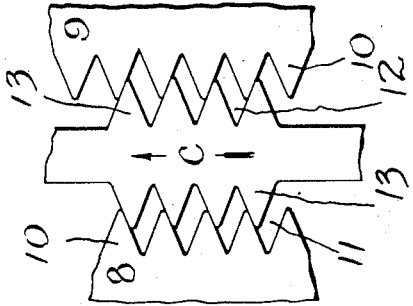
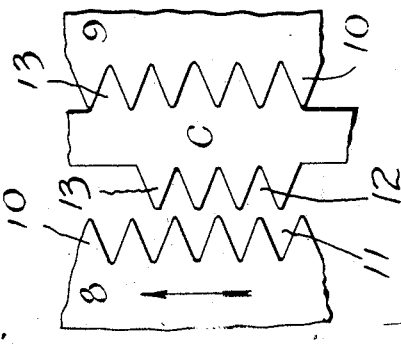
Witnesses:
Inventor:

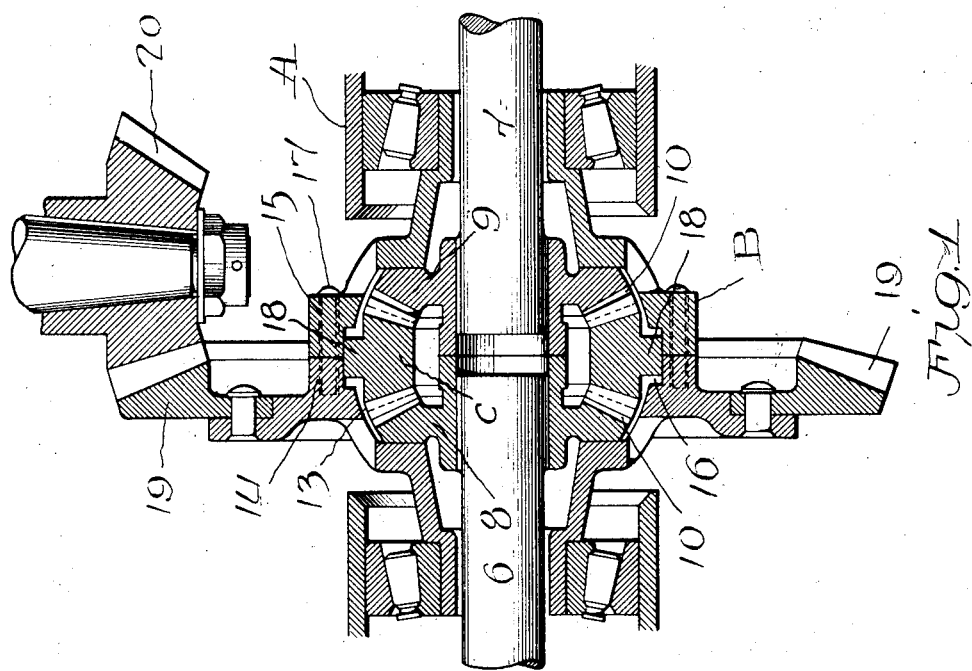

UNITED STATES PATENT OFFICE.

CLARENCE W. TAYLOR, OF CHICAGO, ILLINOIS, ASSIGNOR TO ONLAKE COMPANY, OF CHICAGO, ILLINOIS, A CORPORATION OF ILLINOIS.

DIFFERENTIAL MECHANISM.

1,220,289.     Specification of Letters Patent.     Patented Mar. 27, 1917.

Application filed May 5, 1916. Serial No. 95,545.

*To all whom it may concern:*

Be it known that I, CLARENCE W. TAYLOR, a citizen of the United States of America, residing at Chicago, in the county of Cook and State of Illinois, have invented certain new and useful Improvements in Differential Mechanism, of which the following is a specification.

My invention relates to improvements in differential mechanism, and the objects of my improvement, when applied to motor vehicles, are, first, to provide devices for equalized driving power, second, a construction of mechanism of the class whereby to avoid swerving of the car at high speed or on slippery road, to keep one wheel from spinning while the other is embedded in sand, mud or snow, and to protect tires from grinding and injury, and by holding down the wheel travel to the fewest revolutions for a given distance to reduce power waste; and, third, to afford automatic compensation for the difference in travel of motor vehicle wheels.

With the foregoing and other objects in view, my invention consists in the novel features and in the novel combination and arrangement of parts hereinafter fully described, illustrated in the accompanying drawings forming a part of this specification, and particularly pointed out in the claims hereunto appended, it being understood that changes, variations and modifications in the details of the invention, within the scope of the claims, may be resorted to without departing from the spirit or sacrificing any of the advantages thereof, hence I do not limit my invention to the exact construction and arrangement of parts shown and described.

Referring to the drawings,

Figure 1 is a horizontal section of the central portion of a rear axle construction of an automobile, with my invention incorporated therewith;

Fig. 2 is a perspective view of the single driving member.

Fig. 3 is a diagrammatic view of the positions of the driving and driven members when power is equally applied to both driven members.

Fig. 4 is a similar view of the positions of the driving and driven members when the speed of one driven member is greater than that of the driving member.

Similar numerals and letters refer to similar parts throughout the several views.

The embodiment chosen to illustrate my invention disclosed herein is assembled in a Timken rear axle of a motor vehicle.

Broadly stated my invention comprises a divided or two-part shaft with driven members secured to the meeting ends of the shaft, and power imparting means capable of rotation on the shaft and carrying a single driving member mounted for lateral bodily movement relative to the power imparting means and normally in power transmission engagement with both of the driven members and adapted to be forced by the road power of a vehicle wheel out of engagement with either one of the driven members at a time, and having equalized driving power on both vehicle wheels when their speeds are equal or nearly so.

Preferably the operating parts are formed of metal of sufficient hardness to give a long term of usefulness, but for the purpose of minimizing noise in operation the driving member or the driven members or all may be constructed of any suitable or preferred material to obviate noise in operation.

Referring to the drawings the letter A. designates a non-rotatable housing and the letter B. denotes a power imparting means or rotatable housing, both parts being well known in this art.

At the meeting or adjacent ends 6, 7, of a divided shaft there are secured co-axially disposed driven members 8, 9, each having an annular series of teeth 10 of the bevel type. Preferably the teeth are longer and the valleys 11 between the teeth are deeper than in the case of the ordinary bevel pinion used in the common differential of the bevel gear type. The annular space between the driven members, 8, 9, has positioned therein a single driving member C, disposed concentric with the driven members, and having clutch teeth 13, on both sides suitably formed for power transmission engagement with the driven members, the clutch teeth 13, preferably being disposed in a plurality of series of teeth. I do not limit my invention to the exact formation, arrangement or number of teeth. As in the case of the teeth on the driven member, the teeth on the driving member, the teeth 13, preferably, are longer and the valleys 12 between the teeth are deeper. The angle of the working faces of the teeth, under varying conditions of load, is from 25° to 45°, thirty degrees having given satisfactory results. The greater length of teeth gives a longer "bite" or bearing surface of the teeth when the power distribution is equalized as in the case of a "straight ahead" movement of the motor vehicle. The number and size of the teeth depends somewhat upon the work to be done. Preferably the driven members and the member C are formed with bevel clutch-teeth but are not limited to this form of tooth.

The element B. preferably is formed of two parts 14, 15, each having in its inner wall a plurality of grooves 16 which have open outer ends, where the two parts 14, 15 are secured together by bolts 17. The grooves thus formed are to receive for lateral travel the free ends of the peripheral studs 18 of the element C. For the purpose of alinement of the studs 18 and to prevent lost rotative movement of the member C. the studs 18 are rectangular in form. The grooves 16 are of sufficient length to permit enough bodily movement of the element C. for clearance of either driven member when its speed is greater. The element B. carries a bevel gear wheel 19 which is in mesh with the pinion 20.

In operation, when the power imparting means B, is actuated, the single driving member C. which normally is in mesh with the teeth of both driven members, 8, 9, will, by the cam action of the teeth, be forced to a position equally in mesh with the teeth of both driven members, until one vehicle wheel, in turning a corner or describing a longer radius curve or for other reason, has a greater speed than the other vehicle wheel, when the road power of the faster vehicle wheel will, by the cam action of the teeth, force or slide the driving member bodily and laterally enough to allow the driven member of the vehicle wheel having the greater speed to pass the teeth of the driving member until their speeds are equal or nearly so, when the driving member will again afford a two wheel drive in the direction of rotation of the motor vehicle.

I do not limit my invention to the peripheral studs 18 of the member C and the grooves 16 in the power imparting means for one reason which is obvious that the grooves may be formed as slots transversely in the periphery of the member C and suitable radial studs or projections may be formed on the inner wall of the power imparting means for slidable engagement of the member C with the power imparting means.

It will appear from the drawings and the foregoing description that the distance from the point of the teeth on one side to the points of the teeth on the other side of the driving member C, is greater than the annular space between the driven members, and that all teeth are comparatively long clutch teeth with a depth between them sufficient to permit bodily movement of the driving member C, laterally sufficient for compensating clearance of the driven member having greater speed than the driving member C.

Having thus fully described my invention, what I claim as new, and desire by Letters Patent, is

1. A device of the class described, comprising a divided shaft, co-axially disposed driven members fixed to the adjacent ends of the divided shaft, power imparting means having a plurality of grooves in one wall thereof, a single driving member having peripheral studs disposed between the driven members and normally in engagement with both of them and slidably connected with the power imparting means to permit lateral bodily movement of the driving member relative to the power imparting means.

2. A device of the class described, comprising a pair of co-axially disposed driven members, having an annular space between them, a single driving member disposed concentric with the driven members, in said annular space, power imparting means having a plurality of grooves in one wall thereof, the single driving member having clutch teeth on both sides for power transmitting engagement with the driven members, said single driving member being slidably connected with the power imparting means to permit lateral bodily movement of the driving member relative to the power imparting means, and a shaft secured to each of said driven members.

3. A device of the class described, comprising a pair of co-axially disposed driven members, having an annular space between them, a single driving member disposed concentric with the driven members, in said annular space, power imparting means having a plurality of grooves in one wall thereof, the single driving member having clutch teeth on both sides for power transmitting engagement with the driven members and peripheral studs having their free ends disposed for travel in the grooves of the power imparting means to permit lateral bodily movement of the driving member, and a shaft secured to each of said driven members.

4. A device of the class described, comprising a pair of co-axially disposed driven members, having an annular space between them, a single driving member disposed concentric with the driven members, in said annular space, power imparting means having a plurality of grooves in one wall thereof, the single driving member having a plurality of series of clutch teeth on both sides for power transmitting engagement with the driven members and peripheral studs having their free ends disposed for travel in the grooves in the power imparting means to permit lateral bodily movement of the driving member relative to the power imparting means, and a shaft secured to each of said driven members.

5. A device of the class described, comprising a pair of co-axially disposed driven members, having an annular space between them, a single driving member disposed concentric with the driven members, in said annular space, power imparting means having a plurality of grooves in one wall thereof, the single driving member having a plurality of series of clutch teeth on both sides and peripheral studs having their free ends disposed for travel in said grooves to permit lateral movement of the driving member relative to the power imparting means, each driven member having an annular series of clutch teeth on one side normally in mesh with the clutch teeth of the driving member, and a shaft secured to each of said driven members.

6. A device of the class described, comprising a divided shaft, coaxially disposed driven members fixed to the adjacent ends of the divided shaft, power imparting means having a plurality of grooves in one wall thereof, a single driving member suitably formed for power transmitting engagement with both of the driven members and having peripheral means for sliding engagement with the power imparting means.

7. In a device of the class described, in combination, power imparting means having a plurality of grooves in its inner wall, a plurality of driven members having bevel clutch-teeth on one side, a single driving member having bevel clutch-teeth on both sides thereof and normally in engagement with both of the driven members and having peripheral studs slidably connected with the power imparting means to permit lateral bodily movement relative thereto.

In testimony whereof I affix my signature in the presence of two witnesses.

CLARENCE W. TAYLOR.

Witnesses:
SCOTT M. HOGAN,
C. ANVED.